United States Patent [19]

Dandl

[11] 4,320,618
[45] Mar. 23, 1982

[54] TREE SHAKER ATTACHMENT FOR VEHICLES

[76] Inventor: John E. Dandl, P.O. Box 687, Chico, Calif. 95926

[21] Appl. No.: 245,383

[22] Filed: Mar. 19, 1981

[51] Int. Cl.³ .............................................. A01D 46/26
[52] U.S. Cl. .............................................. 56/328 TS
[58] Field of Search ........................ 56/328 TS, 329; 294/110 B, 116

[56] References Cited

U.S. PATENT DOCUMENTS

| | | | |
|---|---|---|---|
| 3,163,458 | 12/1964 | Brandt, Jr. ................... | 56/328 TS |
| 3,762,139 | 10/1973 | Tompkins ..................... | 56/328 TS |
| 3,771,768 | 11/1973 | Gebendinger ................ | 56/328 TS |
| 3,780,510 | 12/1973 | Tompkins ..................... | 56/328 TS |
| 3,785,131 | 1/1974 | Friday et al. ................ | 56/328 TS |
| 3,793,815 | 2/1974 | Hughes ........................ | 56/328 TS |
| 4,128,986 | 12/1978 | Santarelli ..................... | 56/328 TS |
| 4,194,347 | 3/1980 | Peters .......................... | 56/328 TS |
| 4,223,515 | 9/1980 | Borchard ..................... | 56/328 TS |
| 4,254,608 | 3/1981 | Friday .......................... | 56/328 TS |
| 4,275,548 | 6/1981 | Savage, Sr. .................. | 56/328 TS |

*Primary Examiner*—Paul J. Hirsch
*Attorney, Agent, or Firm*—Robert Charles Hill

[57] ABSTRACT

A tree shaker attachment is disclosed which is preferably adapted for mounting on the lift arms of a vehicle, the attachment including relatively movable jaws each having a clamping pad for engaging a tree or the like, a linear motor means operating an actuating cam means against a first elongated ramp on a movable jaw. A pivotable link is interconnected between the actuating cam and a relatively fixed member of the attachment in order to cause linear operation of the motor or jack to shift the movable jaw toward the other jaw, the attachment also including shaker means for vibrating a tree or the like engaged by the clamping pads of the jaws.

13 Claims, 3 Drawing Figures

TREE SHAKER ATTACHMENT FOR VEHICLES

BACKGROUND OF THE INVENTION

The present invention relates to a tree shaker assembly including a shaker mechanism and a pair of jaws for engaging a tree or the like and more particularly to means for opening and closing the jaws.

A number of different embodiments of tree shakers are disclosed in the prior art, noting for example U.S. Pat. Nos. 4,223,515 issued Sept. 23, 1980; 4,194,347 issued Mar. 25, 1980; 4,128,986 issued Dec. 12, 1978; 3,793,815 issued Feb. 26, 1974; 3,785,131 issued Jan. 15, 1974; 3,780,510 issued Dec. 25, 1973; 3,762,139 issued Oct. 2, 1973 and 3,163,458 issued Dec. 29, 1964.

Tree shakers of the type disclosed by these various patents have included relatively movable jaws for engaging a tree or the like and different types of shaker mechanisms for oscillating or vibrating the shaker assembly and thereby resulting in vibration of the tree in order to loosen crops such as fruit or nuts from the tree.

In one type of shaker implement, the shaker mechanism was adapted for unidirectional reciprocating movement. Generally, it was found that the unidirectional mode of vibration was generally inefficient because of the need for causing relatively violent shaking of the tree. At the same time, damage could result to the tree.

Accordingly, a second type of shaker mechanism was developed comprising a vibrating device which, after having its jaws engaged with a tree or portion of the tree such as a branch or the like, transmitted power from a motor to the tree by means of repeated vibrations having a high-value fixed frequency (for example, 4,000 cycles per minute). In this manner, very small shock waves may be successively produced for generating a high frequency pulsation, the direction of which changes continuously through a 360° arc, the vibration increasing from the largest branches to the smallest branches of the tree. Such shaker mechanisms are believed to be much more effective in detaching fruit or the like from the tree due to composite effects of resonance and because of other characteristics provided by the shaker mechanism.

The particular shaker mechanism described below in connection with the present invention is a generally conventional design of the second type described above and illustrated, for example, in U.S. Pat. No. 4,128,986 issued Dec. 12, 1978. Accordingly, that reference is incorporated herein as though set out in its entirety in order to disclose a suitable shaker mechanism. However, it is also to be kept in mind that the present invention is not limited to any particular type of shaker mechanism employed in its tree shaking apparatus.

Rather, the present invention is particularly concerned with the method of operating a pair of jaws for engaging clamping pads on the jaws with the tree or the like, for maintaining the clamping pads in engagement with the tree during shaking operation and for subsequently disengaging the clamping pads from the tree.

Operation of the shaker mechanism tends to produce substantial forces which may strip bark off and thereby damage the tree if the jaws are not properly engaged with the tree and apply a strong constant pressure thereon. Accordingly, it is necessary to maintain the jaws in proper engagement with the tree without any slippage. It is also desirable that the tree shaker apparatus be relatively simple yet very effectively designed for assuring operation over long periods of time. There has thus been found to remain a need for a tree shaking attachment which is adapted to overcome problems of the type described above while also providing various operating advantages.

SUMMARY OF THE INVENTION

It is therefore an object of the invention to provide a tree shaker mechanism or attachment including relatively movable jaws for engaging a tree or the like, one of the jaws being relatively moved by a longitudinal motor coupled with actuating cam means arranged for engagement with a first elongated ramp on the one movable jaw, a link being pivotably interconnected between the actuating cam and a relatively fixed member of the assembly whereby linear movement of the actuating cam means in one direction of travel is applied to the first elongated ramp means by interaction of the link for positioning the one jaw relative to the other jaw.

Preferably, the other jaw is secured in fixed relation to the fixed member. At the same time, the tree shaker assembly also preferably includes means for positively opening the jaws, the opening means comprising a return cam mounted on the link for interaction with a second ramp arranged in opposition to the first ramp on the one movable jaw.

Additional features are provided within the tree shaker apparatus for further improving its operation. Accordingly, additional objects and advantages of the invention are made apparent in the following description having reference to the accompanying drawings.

BRIEF DESCRIPTION OF THE DRAWINGS

FIG. 3 is an enlarged fragmentary view of a portion of the tree shaker attachment better illustrating means for opening and closing its relatively movable jaws.

DESCRIPTION OF THE PREFERRED EMBODIMENT

Figure 1:
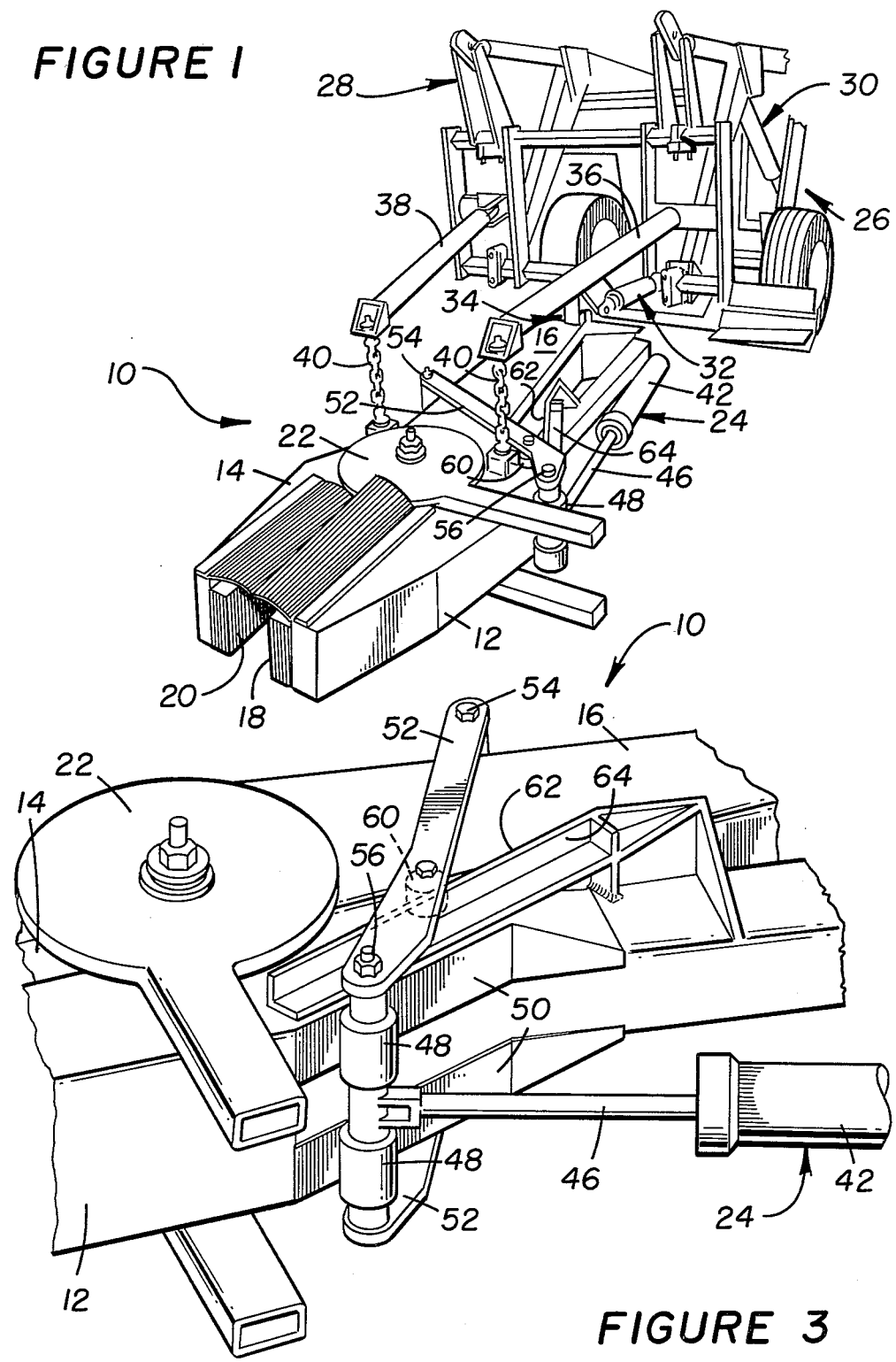
FIG. 1 is an isometric view of a tree shaker attachment constructed according to the present invention and embodied as an attachment secured to the lift arms of a tractor or other vehicle.

Referring now to the drawings and particularly to FIG. 1, a tree shaker mechanism or attachment constructed according to the present invention is indicated generally at 10 and includes jaws 12 and 14 supported in relatively movable relation by a fixed base member 16.

The jaws 12 and 14 are provided with respective pads 18 and 20 preferably formed from resilient material such as an elastomer or rubber, the pads being arranged in opposition for maintaining the tree shaking attachment in engagement with a tree or the like. With the attachment being engaged with a tree, a shaker mechanism 22 is then actuated for vibrating the tree shaking attachment and the tree in order to loosen crops such as fruits and nuts. The jaws 12 and 14 are moved into engagement with each other by motor means in the form of a hydraulic jack 24. The jack 24 operates in combination with additional components as described below for opening and closing the jaws.

A similar jack and associated components could be operated for moving both jaws 12 and 14 toward and away from each other. In such event, both jaws would be movable relative to the fixed base member 16 under similar influence of a motor or jack. However, the present invention preferably includes only one movable arm operated by the motor 24, the other jaw 14 preferably being secured to the fixed base member 16 in order to remain stationary while the one jaw 12 is moved toward and away from it for engaging the tree.

Before describing the construction of the tree shaker attachment 10 in greater detail, it is noted that the attachment is preferably adapted for mounting upon a vehicle such as a tractor partially indicated generally at 26. The tractor 26 is of a type including a movable lift mechanism 28 operable for example by hydraulic jacks such as that indicated at 30 for raising and lowering an implement such as the present tree shaking attachment 10. In addition, the tractor also includes one or more tilt jacks such as that indicated at 32 for also tilting the tree shaking attachment 10. Accordingly, the tree shaking attachment may be positioned by operation of either or both the lift jacks 30 and tilt jacks 32 in order to align it with a desired portion of a tree or the like. The fixed base member 16 of the tree shaking attachment 10 is pivotably connected to the tractor at 34, forwardly extending arms 36 and 38 of the lift assembly being interconnected with the fixed base member 16 by flexible chains 40 in order to better support the tree shaking attachment on the tractor.

Figure 2:
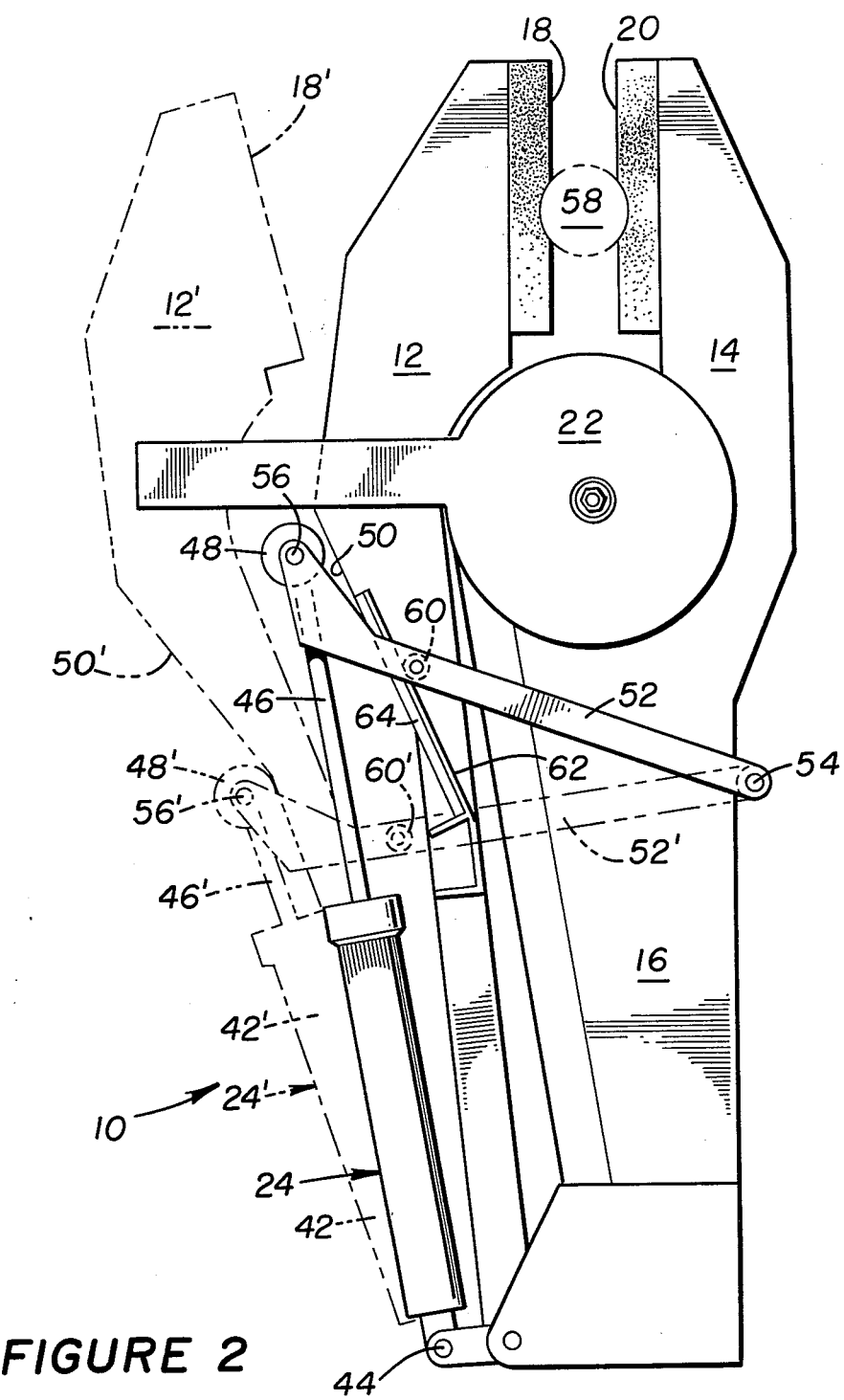
FIG. 2 is a plan view of the tree shaker attachment.

Turning now to the tree shaker attachment 10 itself, its construction may be best seen by reference to FIGS. 2 and 3. As may be best seen in FIG. 2, the fixed jaw 14 extends from the fixed base member 16 to support the clamping pad 20 at its forward end. The movable jaw is illustrated in a closed position at 12 while being illustrated in phantom at an open position indicated at 12'. Similarly, primed numerals are also employed in FIG. 2 to identify the phantom position of other components when the jaw 12 is in its open position. The jaws 12 and 14 as well as the supporting or fixed base member 16 are fabricated structures to provide additional strength and rigidity within the tree shaking attachment. The shaker mechanism 22 is also attached to the fixed base member 16 along with the fixed jaw 14. It will thus be apparent that when a tree or the like is properly engaged by closing of the jaws 12 and 14, the shaker mechanism 22 may then be actuated for causing vibration within the tree.

The elongated motor or jack 24 includes a cylinder 42 pivotably connected with a rear portion of the base member 16 at 44 and an extendible and retractable rod 46 supporting an actuating cam roller 48 at its forward end. It may be seen from FIG. 2 that the jack 24 is arranged generally parallel with the movable jaw 12. The fabricated structure of the movable jaw 12 also forms a first elongated ramp surface 50 arranged for engagement with the actuating cam 48. The actuating cam 48 is maintained in engagement with the ramp surface 50 by means of a pair of links 52 arranged above and below the fixed base member 16, one end of each link being pivotably secured to the actuating cam 48, the other end of each link being pivotably connected to a portion of the fixed base member 16 as indicated at 54. The pivotable mounting for the one end of the links with the actuating cam is indicated at 56. The manner in which the links 52 function in combination with the motor 24 is described in greater detail below. In any event, it may be seen that as the jack 24 is extended, the actuating cam 48 is maintained in engagement with the ramp surface 50 by the links 52 so that the movable jaw is shifted rightwardly toward its solid line position in order to firmly engage the tree 58 between the clamping pads 18 and 20.

An opening cam 60 is also mounted upon one of the links 52 while being arranged for engagement with a second elongated ramp surface 62 formed by a rail 64 secured for example by welding to an upper surface of the movable jaw 12. In any event, the second ramp surface 62 on the rail 64 is arranged for engagement with the opening cam 60.

The second ramp surface 62 is arranged in opposition to the first ramp surface 50 and the actuating cams 48 and 60 are arranged in sufficiently spaced apart relation in order to provide a lost motion connection when operation of the jack 24 is reversed. When the jaw 12 is in its closed position and the motor or jack 24 commences to retract the jaw 12, the opening cam 60 is in engagement with the second ramp surface 62 while the actuating cam 48 is spaced slightly apart from the first ramp surface 50. Accordingly, movement of the actuating cam 48 away from the first ramp surface 50 is necessary to the degree indicated in FIG. 2 before the opening cam 60 engages the second ramp surface 62 in order to positively shift the movable jaw 12 into its open position indicated at 12'.

Continuing with reference to FIG. 2, it may also be seen that the clamping pad 18 on the movable jaw 12 is slightly offset relative to a longitudinal axis of the jaw 12 which is generally parallel with the jack 24. Thus, the opposed clamping pads 18 and 20 will be in more nearly parallel relation as they engage the tree 58. This tends to prevent a scissors effect between the pads and the tree which might otherwise result in movement of the tree between the jaws and damage to the tree. At the same time, the first elongated ramp surface 50 is also offset from the elongated axis of the movable jaw but in the opposite direction as the clamping pad 18. This arrangement causes a wedging effect upon interaction between the actuating cam 48 and the first ramp surface 50 which further facilitates in shifting the movable jaw 12 into its closed position.

It will be apparent that various modifications and additions are possible within the tree shaker mechanism or attachment 10 without departing from the scope of the present invention. For example, as was noted above, the invention may include one movable jaw such as that indicated at 12 and one fixed jaw such as that indicated at 14. At the same time, it would also be possible within the scope of the invention to make both of the jaws movable relative to the base member 16 under the control of the hydraulic jack or motor 24. In addition, it would also be possible to provide an additional hydraulic jack and corresponding actuating means and links for operating the other jaw. However, the construction illustrated in the drawing is preferred because of its relative simplicity. Other such variations will also be apparent within the scope of the invention. Accordingly, the scope of the invention is defined only by the following appended claims.

I claim:
1. Tree shaking apparatus for mounting on a vehicle or the like, comprising
   a pair of jaws,
   a first elongated ramp means formed on one jaw,
   an actuating cam means arranged for engagement with the first ramp means,
   motor means interconnected with the cam means for linearly moving the actuating cam means generally parallel with the first elongated ramp means, a link pivotably interconnected between the actuating cam means and a relatively fixed member of the tree shaking apparatus whereby linear movement of the actuating cam means in one direction of travel is applied against the first elongated ramp means by interaction of the link with the actuating cam means for positioning the one jaw relative to the other jaw, and shaker means for vibrating the tree shaking apparatus when the jaws are engaged with a tree or the like.

2. The tree shaking apparatus of claim 1 wherein interaction of the link, actuating means and first elongated ramp means function to positively close the one jaw toward the other jaw and further comprising means for opening the one jaw during linear movement of the actuating cam means in a return direction of travel.

3. The tree shaking apparatus of claim 2 wherein the means for opening the one jaw comprises a return cam means mounted on the link for interaction with a second ramp means arranged in opposition to the first ramp means.

4. The tree shaking apparatus of claim 3 wherein the second ramp means is a rail mounted for interaction with the return cam means.

5. The tree shaking apparatus of claim 1 wherein the other jaw is fixed in relation to the relatively fixed member.

6. The tree shaking apparatus of claim 5 wherein the jaws include respective clamping pads arranged in opposition to each other for engaging a tree or the like, the pad on the one jaw being offset relative to a longitudinal axis of the one jaw for approaching the clamping pad of the other jaw in generally parallel relation, the first elongated ramp means being offset from the longitudinal axis of the one jaw in the opposite direction from the offset for the pad to facilitate operation of the one jaw by the motor means.

7. The tree shaking apparatus of claim 6 wherein the pads are formed from resilient material.

8. The tree shaking apparatus of claim 2 wherein the actuating cam means and the opening means form a lost motion connection when operation of the motor means is reversed.

9. The tree shaking apparatus of claim 8 wherein the means for opening the one jaw comprises a return cam means mounted on the link for interaction with a second ramp means arranged in opposition to the first ramp means.

10. The tree shaking apparatus of claim 9 further comprising a second link arranged for parallel operation with the first link, the second ramp means being a rail mounted in relatively fixed relation for interaction with the return cam means.

11. The tree shaking apparatus of claim 1 wherein the relatively fixed member includes means for attaching the tree shaking apparatus to lift arms of a vehicle.

12. The tree shaking apparatus of claim 11 further comprising means for tilting the tree shaker apparatus.

13. The tree shaking apparatus of claim 1 wherein the motor means comprises a hydraulic jack.

* * * * *